(12) United States Patent
Hsiao et al.

(10) Patent No.: US 7,924,367 B2
(45) Date of Patent: Apr. 12, 2011

(54) BACKLIGHT MODULE WITH DETACHABLE ILLUMINATOR SUPPORT APPARATUS AND LIQUID CRYSTAL DISPLAY UTILIZING SAME

(75) Inventors: Chih-Chung Hsiao, Miao-Li (TW); Mei-Fang Huang, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 168 days.

(21) Appl. No.: 12/231,436

(22) Filed: Sep. 2, 2008

(65) Prior Publication Data
US 2009/0059118 A1    Mar. 5, 2009

(30) Foreign Application Priority Data
Aug. 31, 2007 (CN) .......................... 2007 1 0076747

(51) Int. Cl.
*G02F 1/1335* (2006.01)
(52) U.S. Cl. .......................................... 349/61; 349/62
(58) Field of Classification Search ............... 349/61, 349/62
See application file for complete search history.

(56) References Cited

U.S. PATENT DOCUMENTS

| | | | | |
|---|---|---|---|---|
| 5,739,893 A * | 4/1998 | Karasawa et al. | ............. | 351/158 |
| 6,538,624 B1 * | 3/2003 | Karasawa et al. | ................. | 345/8 |
| 6,722,773 B2 | 4/2004 | Tsai et al. | | |
| 7,390,983 B2 * | 6/2008 | Mizuno et al. | ............... | 200/61.7 |
| 7,540,649 B2 * | 6/2009 | Satoh et al. | .................... | 362/630 |
| 7,649,588 B2 * | 1/2010 | Hisada | ............................. | 349/58 |
| 2002/0054249 A1 * | 5/2002 | Ryu et al. | ......................... | 349/58 |
| 2003/0161040 A1 * | 8/2003 | Ishii et al. | ..................... | 359/463 |
| 2004/0047141 A1 * | 3/2004 | An | .................................. | 362/31 |
| 2005/0254236 A1 * | 11/2005 | Fu et al. | ........................ | 362/186 |
| 2006/0072343 A1 * | 4/2006 | Shimizu | ....................... | 362/632 |
| 2006/0191776 A1 * | 8/2006 | Mizuno et al. | ............. | 200/43.01 |
| 2007/0025096 A1 * | 2/2007 | Snider et al. | .................... | 362/29 |
| 2008/0007957 A1 * | 1/2008 | Satoh et al. | .................... | 362/362 |
| 2008/0187301 A1 * | 8/2008 | Takahashi | ........................ | 396/55 |
| 2009/0046445 A1 * | 2/2009 | Namiki et al. | ............... | 362/97.2 |

FOREIGN PATENT DOCUMENTS

JP    2007-180006 A    7/2007
JP    2009109691 A *   5/2009

* cited by examiner

*Primary Examiner* — K. Cyrus Kianni
(74) *Attorney, Agent, or Firm* — Wei Te Chung

(57) ABSTRACT

An exemplary backlight module includes a frame and an illuminator support apparatus. The frame defines a through hole therein, and the through hole includes an assembly hole and a location hole communicating with each other. The illuminator support apparatus includes a base and a neck. The base remains fixed to the frame through the location hole. The neck is configured to be slidable from the assembly hole to the location hole and secured to the frame after the supporting body is snugly rotated. A liquid crystal display employing the backlight module is also provided.

16 Claims, 6 Drawing Sheets

US 7,924,367 B2

BACKLIGHT MODULE WITH DETACHABLE ILLUMINATOR SUPPORT APPARATUS AND LIQUID CRYSTAL DISPLAY UTILIZING SAME

FIELD OF THE INVENTION

The present invention relates to a backlight module with a detachable illuminator support apparatus, and a liquid crystal display (LCD) employing the backlight module.

GENERAL BACKGROUND

Liquid crystal displays that are light and thin and have low power consumption characteristics have been widely used in office automation equipment, video units, and the like.

Referring to FIG. 11, a typical direct backlight module 20 includes a diffusing film 21, a plurality of linear illuminators 22, a frame 23, and a plurality of illuminator support apparatuses 24. The frame 23 includes a bottom plate 231, and a plurality of side plates 232 connecting with the bottom plate 231, thus defining a housing (not labeled). The bottom plate 231 includes a plurality of through holes (not labeled) defined therein. The illuminators 22 are received in the accommodating housing, and fixed and supported by the illuminator support apparatuses 24, respectively. Each illuminator support apparatus 24 includes a threaded bottom portion (not labeled) aligned with a respective through hole of the bottom plate 231.

During assembly of the backlight module 20, a plurality of threaded screws 25 are received in the bottom portions of the illuminator support apparatuses 24, respectively, securing the illuminator support apparatuses 24 to the bottom plate 231. However, the need for the screws 25 makes the process of securing and removing the illuminator support apparatuses 24 inconvenient. Further, the engagement of the screws 25 is typically performed by manual labor, increasing the cost of manufacturing the backlight module 20.

What is needed, therefore, is a backlight module that can overcome the described limitations, as well as a liquid crystal display employing the backlight module.

SUMMARY

In an exemplary embodiment, a backlight module includes a frame and an illuminator support apparatus. The frame defines a through hole therein, and the through hole includes an assembly hole and a location hole communicating with each other. The illuminator support apparatus includes a base and a neck. The base is restrained from detachment from the frame through the location hole. The neck is configured (i.e., structured and arranged) to be slidable from the assembly hole to the location hole and secured to the frame after the supporting body is snugly rotated.

Other novel features, advantages and aspects will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments in detail.

Figure 1:
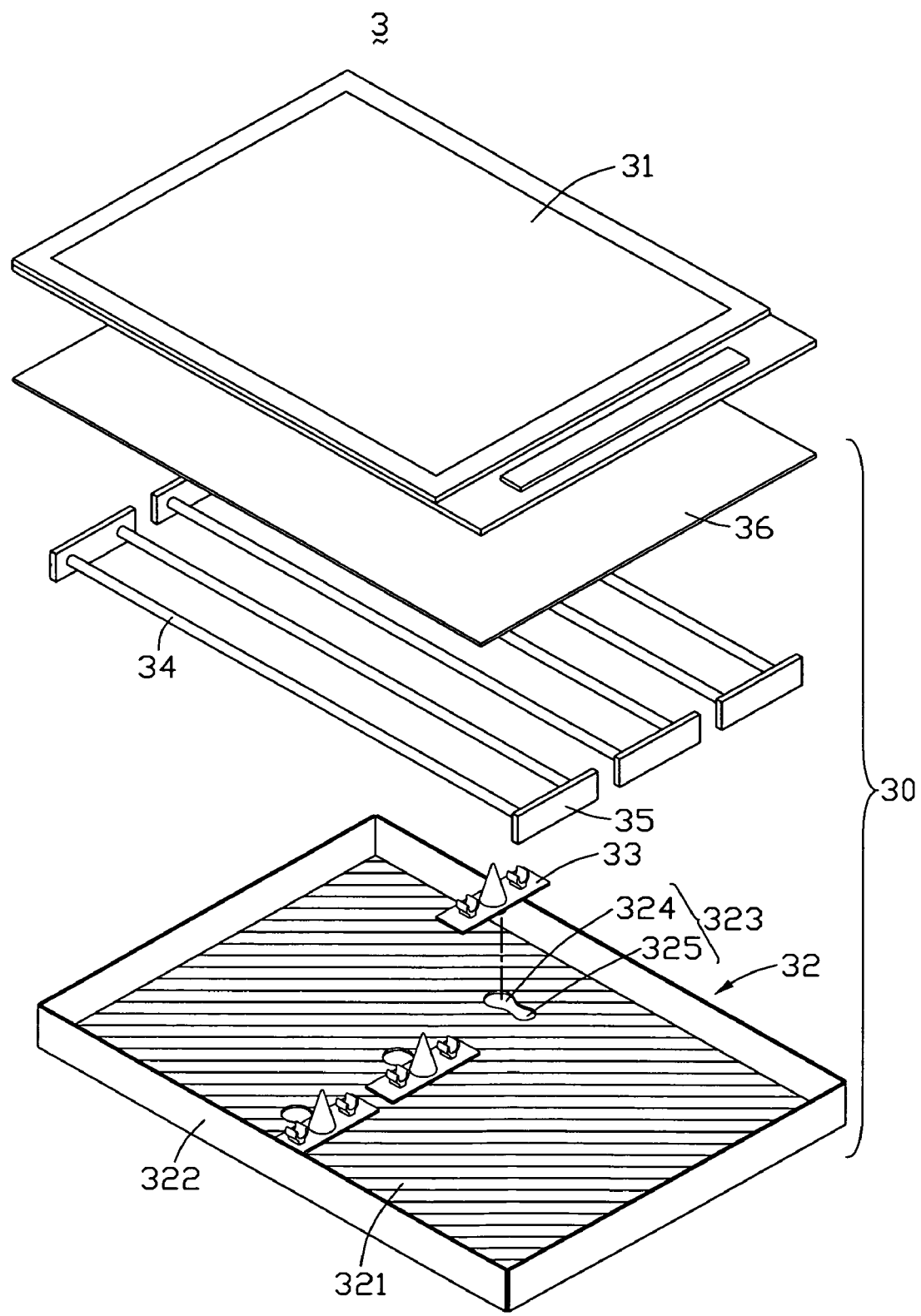
FIG. 1 shows an exploded, isometric view of a liquid crystal display according to an exemplary embodiment of the present invention, the liquid crystal display including a frame and a plurality of illuminator support apparatuses, and the frame defining a plurality of through holes therein.

Referring to FIG. 1, a liquid crystal display 3 according to an exemplary embodiment of the present invention is shown. The liquid crystal display 3 includes a liquid crystal panel 31, and a direct backlight module 30 configured for illuminating the liquid crystal panel 31. The backlight module 30 includes a frame 32, a plurality of illuminator support apparatuses 33, a plurality of linear illuminators 34, a plurality of electrode holders 35, and a diffusing film 36.

The frame 32 includes a bottom plate 321, and a plurality of side plates 322 upwardly extending from edges of the bottom plate 321, thus defining a housing (not labeled) and an opening (not labeled). The bottom plate 321 includes a plurality of through holes 323 defined therein. Each through hole 323 can be considered to include an assembly hole 324 and a location hole 325 communicating with each other. A diameter of the assembly 324 hole is exceeds that of the location hole 325.

Each illuminator 34 includes two opposite electrodes (not labeled). The electrodes of the illuminators 34 are fixed and secured by the electrode holders 35, and electrically connected to an external power source (not shown). In the illustrated embodiment, the illuminators 34 include a plurality of cold cathode fluorescent lamps (CCFLs).

The diffusing film 36 is located between the liquid crystal panel 31 and the illuminators 34. The light beams emitting from the illuminators 34 are diffused by the diffusing film 36 before they reach the liquid crystal panel 31, thus improving optical performance of the liquid crystal display 3.

Figure 2:
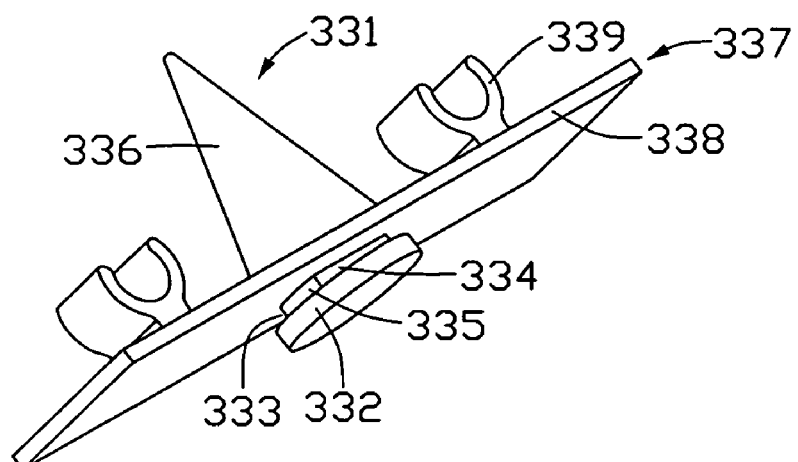
FIG. 2 shows an isometric, enlarged view of the illuminator support apparatus of FIG. 1.
Figure 3:
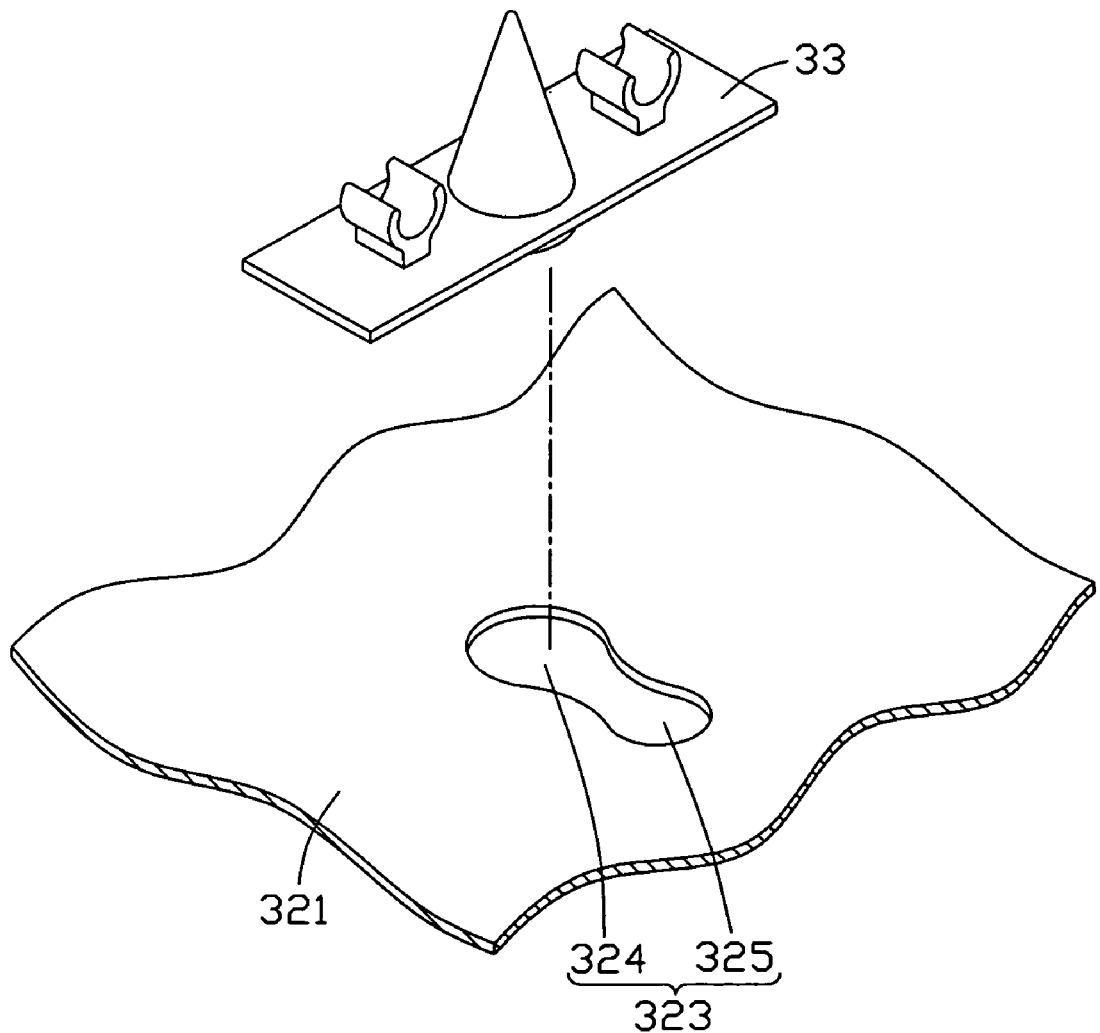
FIG. 3 shows the illuminator support apparatus and a part of a bottom plate of the frame of FIG. 1.

Referring also to FIG. 2, each illuminator support apparatus 33 includes a supporting body 331 and a holding body 337 formed therewith. The holding body 337 includes a planar plate 338 and two illuminator holders 339 extending from the planar plate 338. Each illuminator holder 339 is substantially C-shaped, and configured to snugly support and fix a respective illuminator 34. The supporting body 331 includes a base 332, connected by a neck 333 to a supporting portion 336. The supporting portion 336 is substantially conical, and configured to snugly support the diffusing film 36. The base 332 is a substantially rounded bolt. A diameter of the base 332 is less than that of the assembly hole 324, but exceeds that of the location hole 325. A thickness of the neck 333 is substantially equal to that of the bottom plate 321 of the frame 32. The neck 333 includes two planar surfaces 334 and two curved side surfaces 335. The planar surfaces 334 are parallel to each other, and a distance therebetween is equal to a minimum width of the neck 333. The curved surfaces 335 are separate from each other, and each interconnect the two planar surfaces 334. With the above-described configurations, the neck 333 is slidable from the assembly hole 324 to the location hole 325.

Figure 4:
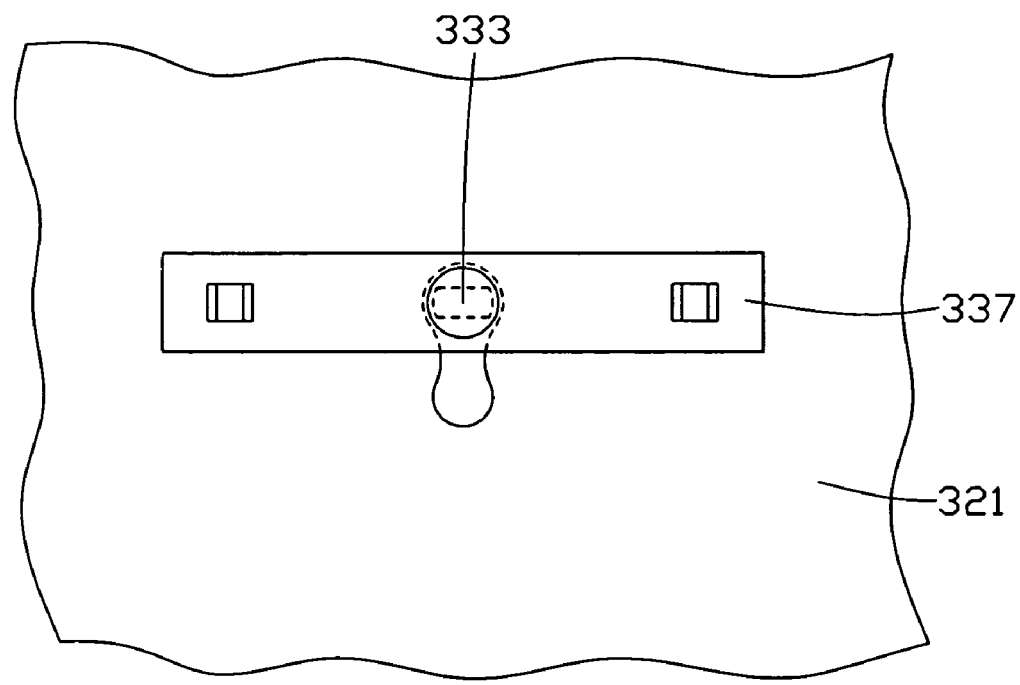
FIG. 4 to FIG. 6 show a procedure of securing the illuminator support apparatus to the bottom plate of FIG. 3.
Figure 5:
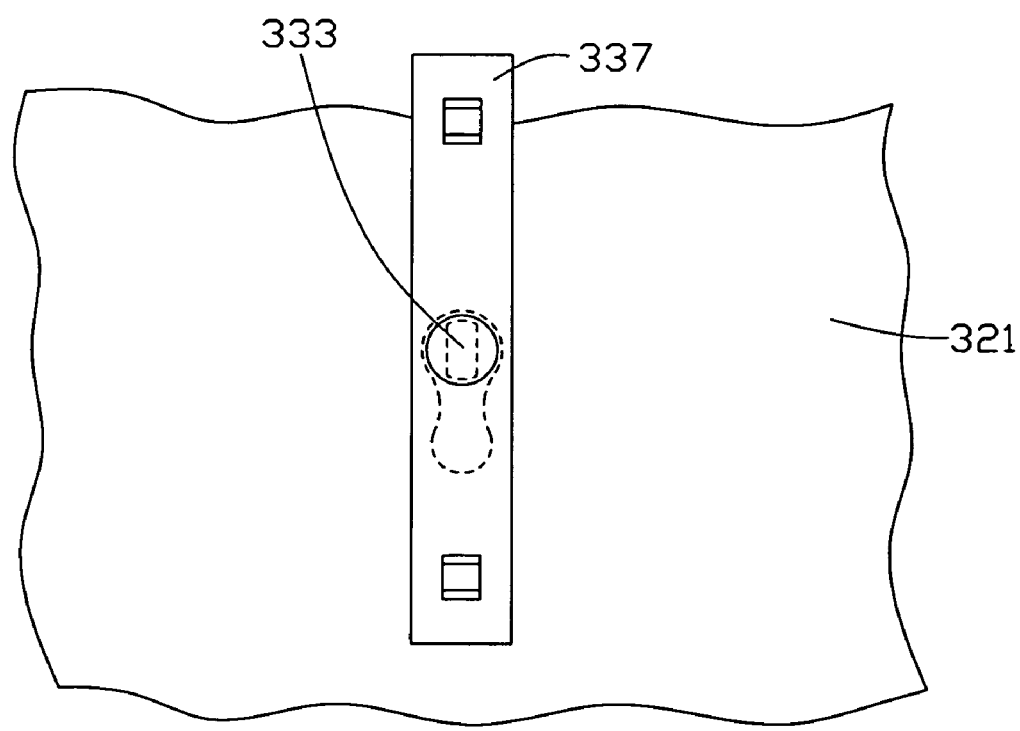
Figure 6:
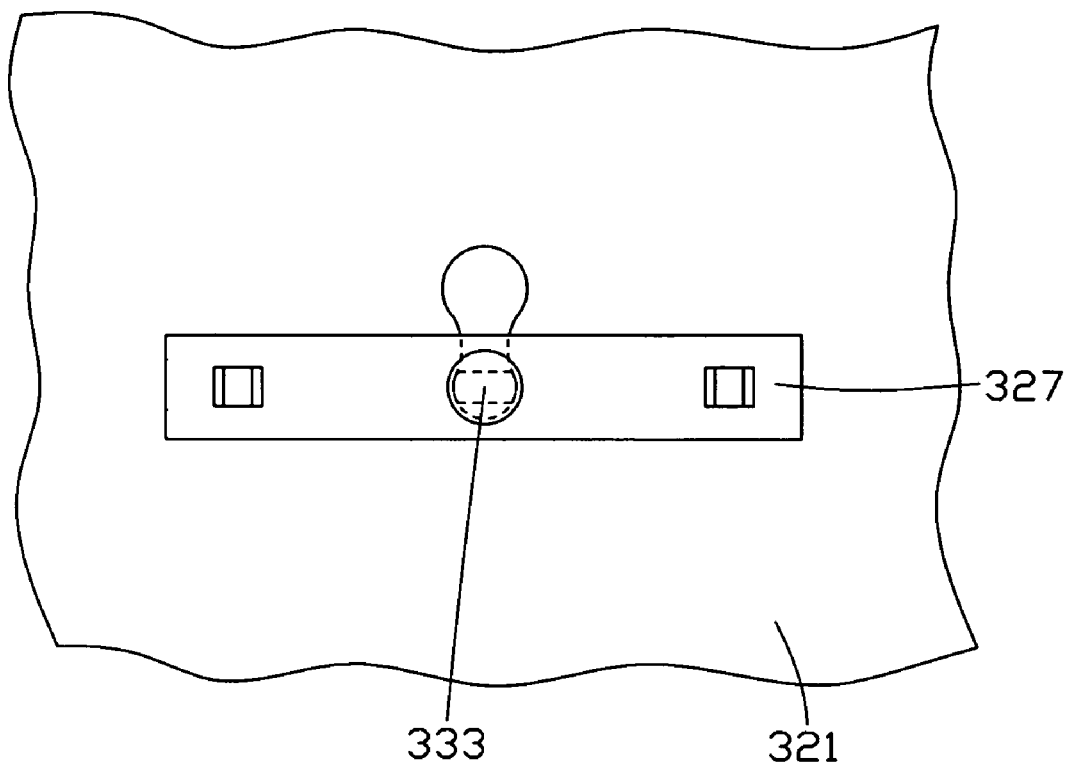

Referring also to FIG. 4 to FIG. 6, the illuminator support apparatus 33 can be conveniently secured to the frame 32. First, the base 332 is aligned with the assembly hole 324, and extends through the assembly hole 325. Accordingly, the neck 333 of the illuminator support apparatus 33 is received in the assembly hole 324. The supporting body 331 is secured to the bottom plate 321. The neck 333 of the supporting body 331 slides into the location hole 325 from the assembly hole 324, and is rotated until the curved surfaces 335 thereof abut portions defining the location hole 325 of the bottom plate 321. Thus, the neck 333 is received in the location hole 325, and the bottom plate 321 is sandwiched between the base 332 and the supporting portion 336. Because the diameter of the base 332 exceeds that of the location hole 325, the base 332 remains in the location hole 325. The illuminator support apparatus 33 is accordingly secured to the bottom plate 321 without screws. Detachment of each illuminator support apparatus 33 constitutes essentially a reverse of the described securing procedure.

In summary, the illuminator support apparatus 33 can be conveniently secured to or detached from the frame 32 without requiring any screws, which improves efficiency of assembly or detachment of the backlight module 30 and the related liquid crystal display 3, and further reduces the cost of manufacture thereof.

Figure 7:
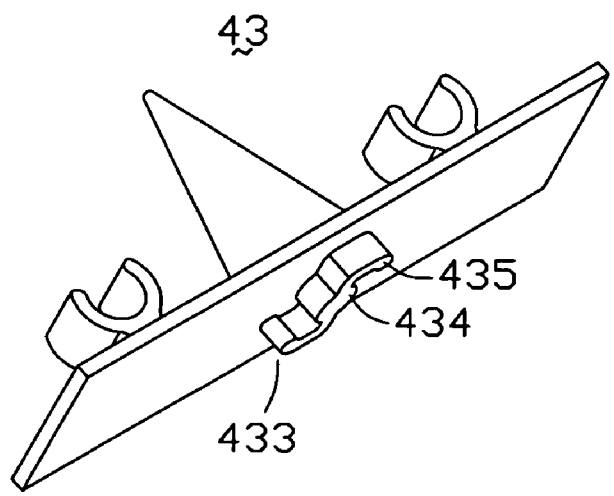
FIG. 7 shows an alternative illuminator support apparatus.
Figure 8:
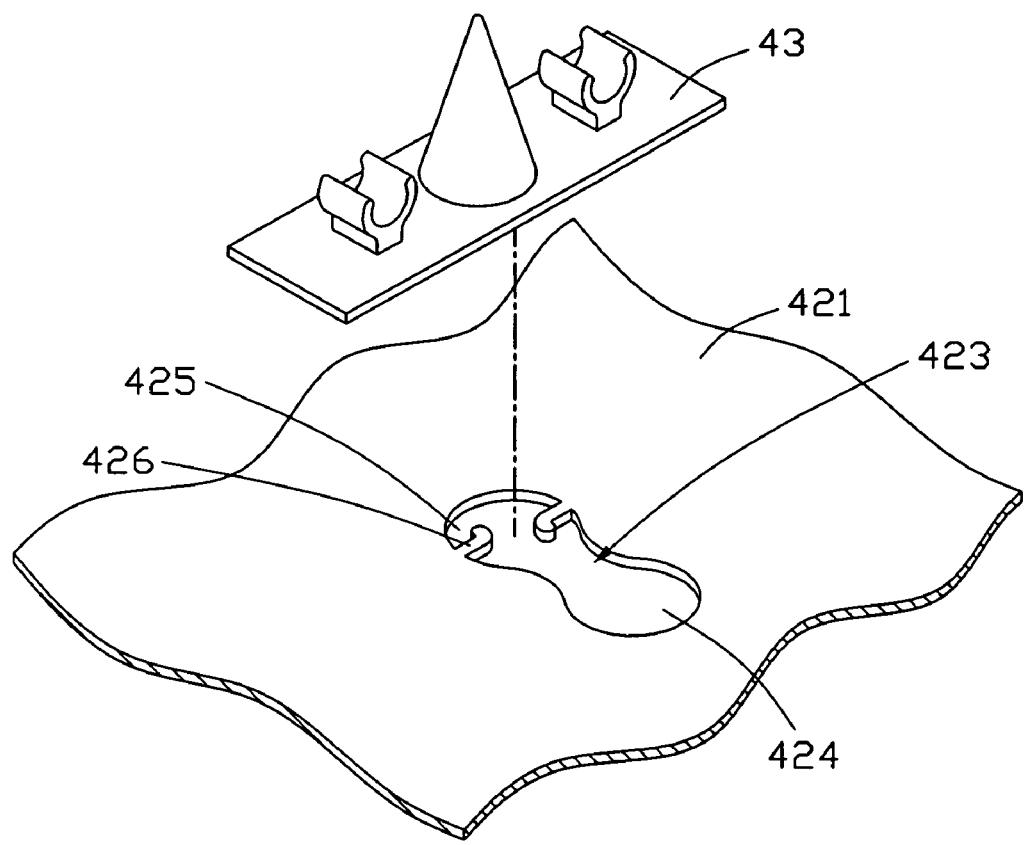
FIG. 8 shows the alternative illuminator support apparatus of FIG. 7 and a part of an alternative frame.
Figure 9:
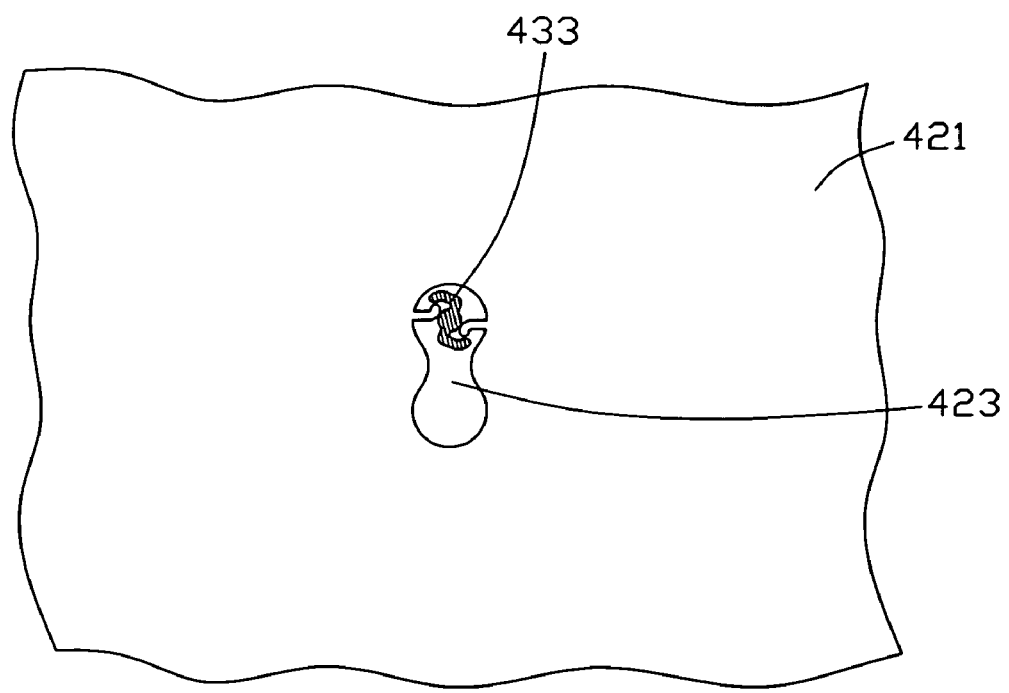
FIG. 9 and FIG. 10 show a procedure of securing the alternative illuminator support apparatus to the alternative frame.
Figure 10:
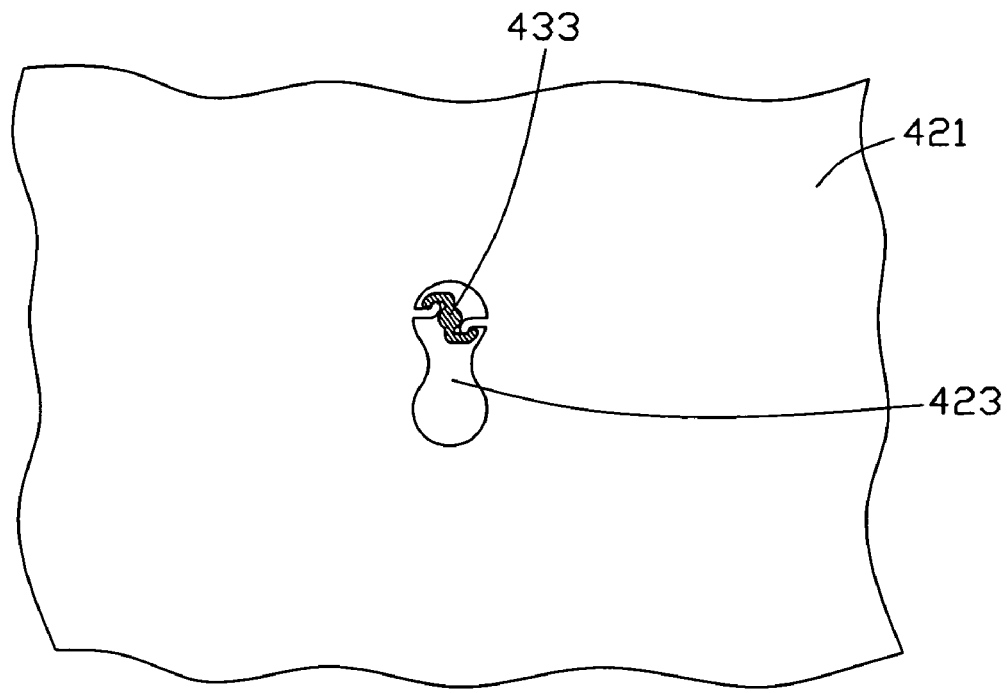
Figure 11:
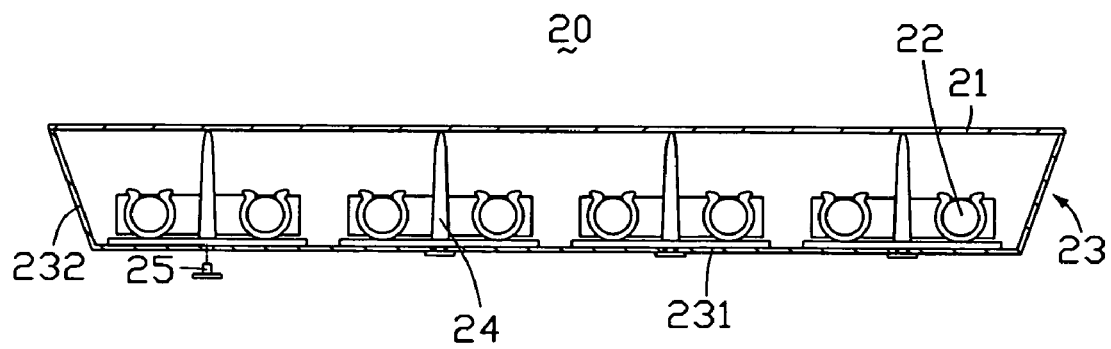
FIG. 11 is a side view of a conventional backlight module.

Referring to FIG. 7, an alternative illuminator support apparatus 43 is shown. The illuminator support apparatus 43 is similar to the illuminator support apparatus 33, and includes a supporting body (not labeled) having a neck 433. The neck 433 includes a rounded bolt 434, and two curved first arms 435 extending from edges of the bolt 434. The first arms 435 are symmetric about a center (not labeled) of the bolt 434. Correspondingly, an alternative bottom plate 421 of an alternative frame (not shown) defines a plurality of through holes 423 therein. Each through hole 423 can be considered to include an assembly hole 424, and a location hole 425 communicating with the assembly hole 424. The bottom plate 421 includes two curved second arms 426 extending into respective location holes 425. The second arms 426 correspond to the first arms 435, respectively. The first arms 435 and the second arms 426 mesh with each other, such that when the bolt 434 slides into the location hole 425, and is rotated in a predetermined direction, the first arms 435 and the second arms 426 mesh. Thus, the illuminator support apparatus 43 is conveniently secured to and detached from the bottom plate 431. The illuminator support apparatus 43 provides the backlight module with advantages similar to those achieved by the illuminator support apparatus 33.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A backlight module comprising:
   a frame defining a through hole therein, the through hole comprising an assembly hole and a location hole communicating with each other, a diameter of the location hole being less than a diameter of the assembly hole; and
   an illuminator support apparatus comprising a supporting body, the supporting body being slidable from the assembly hole to the location hole and secured to the frame after the supporting body is snugly rotated;
   wherein the supporting body comprises a base connected by a neck to the supporting body, a lateral surface of the neck comprises two parallel planar side surfaces opposite to each other and two opposite curved side surfaces interconnected to the two planar side surfaces, a maximum distance between two curved side surfaces is substantially equal to the diameter of the location hole, and the neck is capable of sliding from the assembly hole to the location hole along a direction parallel to a length direction of the two planar side surfaces, and then rotating in the location hole so that the two curved side surfaces abut against the location hole.

2. The backlight module of claim 1, wherein the frame comprises a bottom plate, and a plurality of side plates integrally formed with the bottom plate.

3. The backlight module of claim 2, wherein the through hole is defined in the bottom plate.

4. The backlight module of claim 1, wherein a diameter of the base is less than the diameter of the assembly hole, and exceeds the diameter of the location hole.

5. The backlight module of claim 1, wherein a thickness of the neck is substantially equal to a thickness of the bottom plate.

6. The backlight module of claim 1, wherein a distance between the two planar side surfaces is substantially equal to a minimum width of the neck.

7. The backlight module of claim 1, wherein the neck remains fixed in the location hole after the illuminator support apparatus is snugly rotated, and is able to slide back to the assembly hole when the illuminator support apparatus is reversely rotated.

8. The backlight module of claim 1, wherein the illuminator support apparatus further comprises a holding body crossed and integrated with the supporting body, and the holding body comprises a planar plate and two illuminator holders extending from the planar plate.

9. The backlight module of claim 8, wherein the supporting body is located between the two illuminator holders.

10. A liquid crystal display comprising:
    a liquid crystal panel; and
    a backlight module configured to illuminate the liquid crystal panel, the backlight module comprising:
    a frame defining a through hole therein, the through hole comprising an assembly hole and a location hole communicating with each other, a diameter of the location hole being less than a diameter of the assembly hole; and
    an illuminator support apparatus comprising a supporting body, the supporting body configured to be slidable from the assembly hole to the location hole and secured to the frame after the supporting body is snugly rotated;
    wherein the supporting body comprises a base connected by a neck to the supporting body, a lateral surface of the neck comprises two parallel planar side surfaces opposite to each other and two opposite curved side surfaces interconnected to the two planar side surfaces, a maximum distance between two curved side surfaces is substantially equal to the diameter of the location hole, and the neck is capable of sliding from the assembly hole to the location hole along a direction parallel to a length direction of the two planar side surfaces, and then rotating in the location hole so that the two curved side surfaces abut against the location hole.

11. The liquid crystal display of claim 10, wherein the frame comprises a bottom plate, and a plurality of side plates integrally formed with the bottom plate.

12. The liquid crystal display of claim 11, wherein the through hole is defined in the bottom plate.

13. The liquid crystal display of claim 10, wherein a diameter of the base is less than the diameter of the assembly hole, and exceeds the diameter of the location hole.

14. The liquid crystal display of claim 10, wherein a thickness of the neck is substantially equal to a thickness of the bottom plate.

15. The liquid crystal display of claim 10, wherein a distance between the planar side surfaces is substantially equal to a minimum width of the neck.

16. The liquid crystal display of claim 10, wherein the neck remains fixed in the location hole after the illuminator support apparatus is snugly rotated, and is able to slide back to the assembly hole when the illuminator support apparatus is reversely rotated.

* * * * *